United States Patent
Chen et al.

(10) Patent No.: US 7,483,227 B1
(45) Date of Patent: Jan. 27, 2009

(54) DETECTING A THERMAL ASPERITY CONDITION OF A DISK DRIVE HEAD RESPONSIVE TO DATA VALUE TRANSITIONS

(75) Inventors: Jinghuan Chen, Newport Beach, CA (US); Raymond Pavlak, Jr., Shrewsbury, MA (US); Jingfeng Liu, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 326 days.

(21) Appl. No.: 11/442,752

(22) Filed: May 30, 2006

Related U.S. Application Data (60) Provisional application No. 60/717,901, filed on Sep. 16, 2005.

(51) Int. Cl.
*G11B 5/02* (2006.01)
(52) U.S. Cl. .......................................... 360/25; 360/31
(58) Field of Classification Search ....................... None
See application file for complete search history.

(56) References Cited

U.S. PATENT DOCUMENTS

| | | | | |
|---|---|---|---|---|
| 6,104,563 | A | 8/2000 | Dovek et al. .................. | 360/66 |
| 6,628,468 | B1 * | 9/2003 | Du ............................... | 360/53 |
| 6,920,001 | B2 * | 7/2005 | Chua et al. .................... | 360/25 |
| 2002/0191314 | A1 * | 12/2002 | Ottesen et al. ................ | 360/31 |
| 2003/0030934 | A1 * | 2/2003 | Schaff et al. .................. | 360/66 |

OTHER PUBLICATIONS

Klaassen; *Electronic Abatement of Thermal Interference in (G) MR Head Output Signals*; IEEE Transaction on Magnetics, vol. 33, No. 5, pp. 2611-2616; Sep. 1997.

Patapoutian; *Baseline Wander Compensation for the Perpendicular Magnetic Recording Channel*; IEEE Transactions on Magnetics, vol. 40, No. 1; pp. 235-240; Jan. 2004.

* cited by examiner

*Primary Examiner*—Jason C Olson
(74) *Attorney, Agent, or Firm*—Myers Bigel Sibley & Sajovec, P.A.

(57) ABSTRACT

Methods are disclosed for detecting a thermal asperity condition of a head that is configured to generate a read signal by reading data on a rotatable data storage disk in a disk drive. The read signal includes a data component and a thermal component. The read signal is compared to a thermal asperity threshold to detect occurrence of an excessive level of the thermal component of the read signal as a thermal asperity condition of the head. The thermal asperity threshold is varied in response to a rate of occurrence of data value transitions in the data component of the read signal. The thermal asperity threshold can be increased in response to a decrease in the rate of occurrence of data value transitions, and can be decreased in response to an increase in the rate of occurrence of data value transitions. By varying the thermal asperity threshold, the sensitivity of the thermal asperity detector may be improved to allow lower level thermal asperity conditions to be detected with increased accuracy. Related disk drives are also disclosed.

22 Claims, 8 Drawing Sheets

DETECTING A THERMAL ASPERITY CONDITION OF A DISK DRIVE HEAD RESPONSIVE TO DATA VALUE TRANSITIONS

RELATED APPLICATION

This application claims the benefit of and priority to U.S. Provisional Patent Application No. 60/717,901, filed Sep. 16, 2005, the disclosure of which is hereby incorporated herein by reference as if set forth in its entirety.

FIELD OF THE INVENTION

The present invention generally relates to magnetic data storage devices and, more particularly, to filtering a read signal in a magnetic data storage device.

BACKGROUND OF THE INVENTION

Disk drives are a common type of magnetic data storage device. Digital information is stored within concentric tracks on a storage disk which is coated with a magnetic material that is capable of changing its magnetic orientation in response to an applied magnetic field.

During operation of a conventional disk drive, the disk is rotated about a central axis at a substantially constant rate. To read data from or write data onto the disk, a head is held close to a desired track of the disk while the disk is spinning. Writing is performed by delivering a write signal having a variable current to the head while the head is held close to the desired track. The write signal creates a variable magnetic field at a gap portion of the head that induces magnetic polarity transitions into the desired track which represent the data being stored.

Reading is performed by sensing the magnetic polarity transitions on the rotating track with the head. As the disk spins relative to the head, the magnetic polarity transitions on the track present a varying magnetic field to the head. The head converts the varying magnetic field into an analog read signal that is then processed by a read channel circuit. The read channel circuit converts the analog read signal into a timed digital signal that is processed by a data controller to extract data for communication to a host computer system.

The head can include a single element, such as an inductive read/write element for use in both reading and writing, or it can include separate read and write elements. Heads that include separate elements for reading and writing are known as "dual element heads" and usually include a magneto-resistive (MR) read element for performing the read function.

Dual element heads can have more sensitivity than single element heads because the dual elements can be separately optimized to perform particular functions (i.e., reading data or writing data). For example, MR read elements are generally more sensitive to small variable magnetic fields than are single element inductive heads and, thus, can read much fainter signals from the disk surface. The higher sensitivity of MR elements may allow data to be more densely packed on the surface without an unacceptable loss of read performance.

MR read elements generally include a strip of MR material that is held between two magnetic shields. The resistance of the MR material varies almost linearly with the applied magnetic field. During a read operation, the MR strip is held near a desired track to sense the varying magnetic field caused by the magnetic transitions on the track. A constant DC current is passed through the MR strip while the varying magnetic fields from the track cause a variable voltage to be generated across the MR strip. By Ohm's law (i.e., $V=IR$), the variable voltage is proportional to the varying resistance of the MR strip and, hence, is representative of the data stored within the desired track. The variable voltage signal (which is the analog read signal) is then processed by the read channel circuit and data controller to extract data for use by the host.

There are many operational variables that can adversely affect the read performance of a magnetic disk drive. Among the variables, those which cause temperature variations in the MR element can be particularly troublesome. More specifically, because MR elements are positive temperature coefficient devices, increase in the temperature of an MR element causes an increase in the resistance of the MR element. Because the read signal (in volts) is proportional to the variations in resistance of the MR element multiplied by the bias current, and because the bias current is usually a constant DC current, when the temperature of the MR element is increased, a thermal component is generated which adds to the value of the read signal. Accordingly, the read signal has a data component and a thermal component.

One operational variable is related to foreign particles or other aberrations on the surface of the disk that can contribute to generation of the thermal component of the read signal. These foreign particles and aberrations are known as asperities. Collisions between the asperities and the head cause the head to be further heated. This increase in head temperature increases the resistance of the MR element. Because the bias current is usually constant, the resulting voltage appears to be greater than the voltage that should be present based upon the data stored on the magnetic disk. The additive signal resulting from the change in temperature of the MR element is known as a thermal asperity.

Another operational variable is related to variations in the gap between the head and the disk due to the disk surface variations, which can also contribute to generation of the thermal component of the read signal. The head is heated to a temperature above the ambient temperature (e.g., 20 degrees above ambient temperature) by the bias current. The temperature of the disk is essentially equal to the ambient temperature and thereby operates as a heat sink which takes heat away from the head. As the relative gap varies due to the surface variations of the disk, the head is correspondingly cooled at varying rates, which causes a variation in the resistance of the head MR element. This resistance variation contributes to the thermal component of the read signal, and is known as baseline modulation.

By way of example, when a disk protrusion causes the gap between the disk and the MR element to decrease, the disk conducts heat from the MR element at a higher rate which causes the temperature of the MR element to rapidly decrease. As the temperature of the MR element decreases, the resistance of the MR element likewise decreases. Similarly, when a valley on the disk increases the gap between the disk and the MR element, the disk conducts head from the MR element at a lower rate which causes the temperature of the MR element to rapidly increase. As the temperature of the MR element increases, the resistance of the MR element likewise increases. Accordingly, the magnitude of the thermal component of the read signal from the MR element can be modulated by the surface roughness of the disk.

Figure 1:
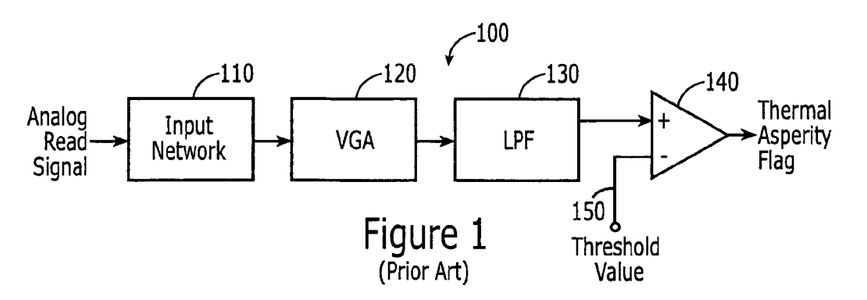
FIG. 1 is a block diagram of a conventional thermal asperity detector.

As explained above, the thermal component of the read signal due to change in temperature of the head is known as a thermal asperity. When the level of this thermal component becomes excessive, the head is considered to be subjected to a thermal asperity condition. Some disk drives include a thermal asperity detector which is configured to detect the presence of a thermal asperity condition so that effects of the condition on the read signal may be suppressed. FIG. 1 is a block diagram of a conventional thermal asperity detector 100. The detector 100 includes an input network 110, a variable gain amplifier (VGA) 120, a low pass filter (LPF) 130, and a comparator 140. An analog read signal is passed through the input network 110, which may be configured as an AC coupling circuit. The VGA 120 amplifies the read signal from the input network 110. The LPF 130 filters the amplified read signal to extract the DC component. The comparator 140 compares the filtered read signal to a threshold value and, when the filtered read signal exceeds the threshold value 150, sets a thermal asperity flag to indicate the occurrence of a thermal asperity condition of the head.

Figure 2:
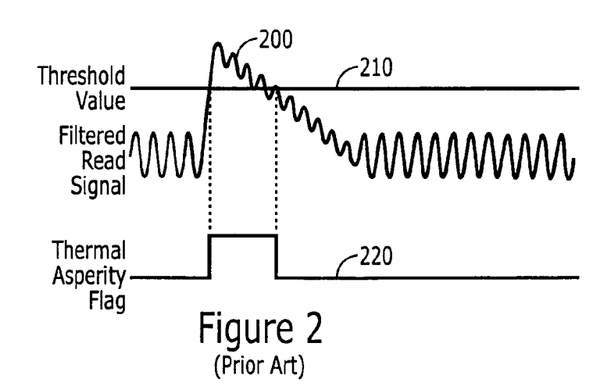
FIG. 2 shows graphs of a read signal, a comparison threshold value, and the varying states of a thermal asperity flag.

The threshold value 150 is typically set to a defined margin level above the expected envelope of the filtered read signal from the LPF 130 in an attempt to avoid false indications of the presence of a thermal asperity condition of the head. FIG. 2 shows graphs that illustrate a filtered read signal, the threshold value, and the varying states of the thermal asperity flag. The filtered read signal from the LPF 130 is represented by waveform 200, the threshold value is represented by line 210, and the thermal asperity flag is represented by waveform 220. The thermal asperity flag (waveform 220) is set to logic 1 while the filtered read signal (waveform 200) exceeds the threshold value (line 210). Accordingly, selecting a low threshold value can increase the sensitivity of the thermal asperity detector to detecting thermal asperity conditions, but it can also increase the occurrence of false indications of thermal asperity conditions when an insufficient margin is maintained between the data component of the filtered read signal and the threshold value.

Figure 3:
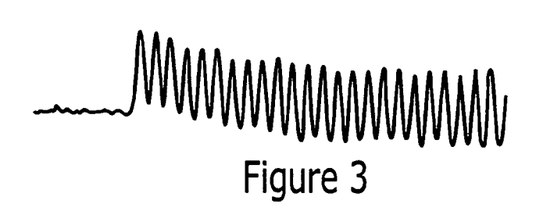
FIG. 3 shows a graph that illustrates exemplary baseline wander in a read signal following reading of a long DC pattern.

Complicating the selection of an appropriate threshold value is that the average DC value of the read signal can vary over time due to, for example, baseline wander. FIG. 3 is a graph that illustrates exemplary baseline wander in a read signal following reading of a long DC pattern. Because baseline wander increases the expected magnitude range of the read signal, a sufficient margin should be maintained between the selected threshold value and the data component of the read signal. Disk drives that utilize perpendicular recording can have a much greater baseline wander in read signals than disk drives that utilize longitudinal recording. Greater baseline wander may necessitate a greater margin which, correspondingly, may reduce the ability of a thermal asperity detector to detect small to medium indications of a thermal asperity condition of a head. Accordingly, there is a need to develop further methods and apparatus capable of improving the detection of a thermal asperity condition.

SUMMARY OF THE INVENTION

Some embodiments of the present invention are directed to a method of detecting a thermal asperity condition of a head in a disk drive. The head is configured to generate a read signal by reading data on a rotatable data storage disk in the disk drive. The read signal includes a data component and a thermal component. The read signal is compared to a thermal asperity threshold to detect occurrence of an excessive level of the thermal component of the read signal as a thermal asperity condition of the head. The thermal asperity threshold is varied in response to a rate of occurrence of data value transitions in the data component of the read signal. For example, in some embodiments, the thermal asperity threshold is increased in response to a decrease in the rate of occurrence of data value transitions, and the thermal asperity threshold is decreased in response to an increase in the rate of occurrence of data value transitions. By varying the thermal asperity threshold, the sensitivity of the thermal asperity detector may be improved to allow lower level thermal asperity conditions to be detected with increased accuracy.

In some further embodiments, the read signal is filtered with a band pass filter that has an adjustable lower attenuation frequency and an upper attenuation frequency, and the lower attenuation frequency is adjusted in response to the thermal asperity threshold. For example, the lower attenuation frequency can be increased to a higher frequency while the read signal exceeds the thermal asperity threshold, and the lower attenuation frequency can be returned to a baseline frequency while the read signal does not exceed the thermal asperity threshold.

Some other embodiments of the present invention are directed to a disk drive that includes a rotatable data storage disk, a head, and a thermal asperity detector. The head is configured to read data from the disk to generate a read signal. The read signal includes a data component and a thermal component. The thermal asperity detector is configured to compare the read signal to a thermal asperity threshold to detect occurrence of an excessive level of the thermal component of the read signal as a thermal asperity condition of the head. The detector is further configured to vary the thermal asperity threshold in response to the rate of occurrence of data value transitions in the data component of the read signal.

DETAILED DESCRIPTION OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. In the drawings, the size and relative sizes of regions may be exaggerated for clarity.

Some embodiments of the present invention provide disk drives and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, or transport the program for use by or in connection with the instruction execution system, apparatus, or device.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

In accordance with some embodiments of the present invention, a thermal asperity detector compares a read signal against a variable thermal asperity threshold which is varied in response to the rate of data value transitions in the data component of the read signal. By varying the thermal asperity threshold, the sensitivity of the thermal asperity detector may be improved to allow lower level thermal asperity conditions to be detected with increased accuracy.

Figure 4:
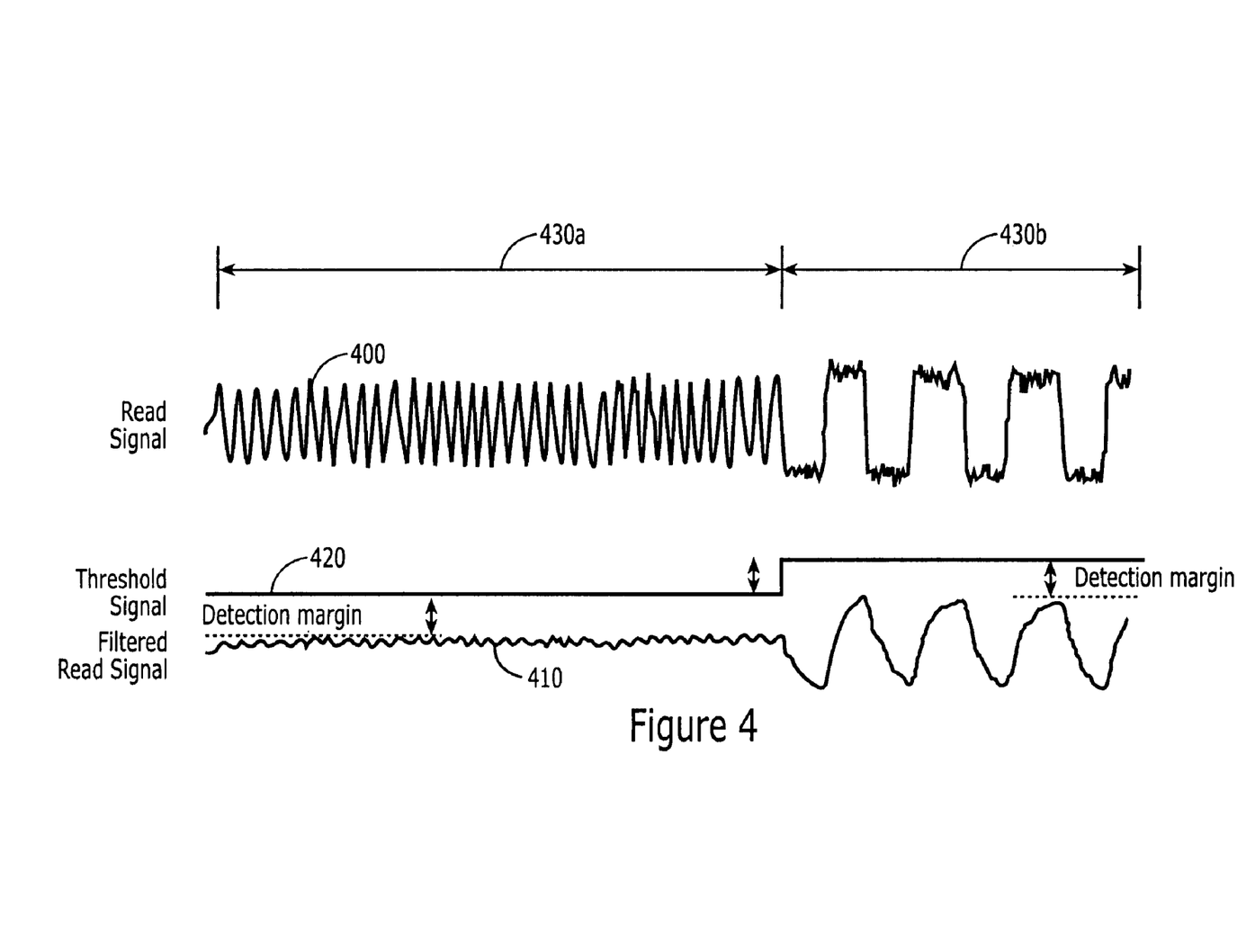
FIG. 4 shows graphs that illustrate the operation of a thermal asperity detector and methods which compare a filtered read signal to a threshold signal that is varied in response the rate of data value transitions in the data component of a read signal, in accordance with some embodiments of the present invention.

FIG. 4 shows graphs that illustrate the operation of a thermal asperity detector and methods that compare a filtered read signal to a threshold signal that is varied in response the rate of data value transitions in the data component of the read signal. Referring to FIG. 4, the read signal is represented by waveform 400, the low pass filtered read signal is represented by waveform 410, and the variable threshold signal is represented by waveform 420. In this example, data is read from a perpendicularly recorded disk and the data component of the read signal is coded with a run-length data constraint of 20 bits. Accordingly, the longest delay between data value transitions in the data component of the read signal is 20 T, where T is the time space of each bit cell. The read signal 400 includes a higher-frequency 2 T pattern that occurs during timeframe 430a followed by a low-frequency 20 T pattern that occurs during timeframe 430b.

As shown in FIG. 4, the magnitude of the threshold signal is varied in response to the rate of data value transitions in the data component of the read signal 400. The magnitude of threshold signal 420 is lower during timeframe 430a while the data transitions in the read signal 400 occur at rate 2 T, and is increased during timeframe 430b while the data transitions in the read signal 400 occur at rate 20 T. Accordingly, the threshold signal 420 is decreased while the data transitions in the read signal 400 occur at a higher rate, which can correspond to when a lower level of baseline wander is expected. The threshold signal 420 is increased while the data transitions in the read signal 400 occur at a lower rate, which can correspond to when a higher level of baseline wander is expected. By comparing the variable threshold signal to the filtered read signal, the detection sensitivity of a detector may be dynamically adjusted so as to detect lower level thermal asperity conditions with increased accuracy.

Figure 5:
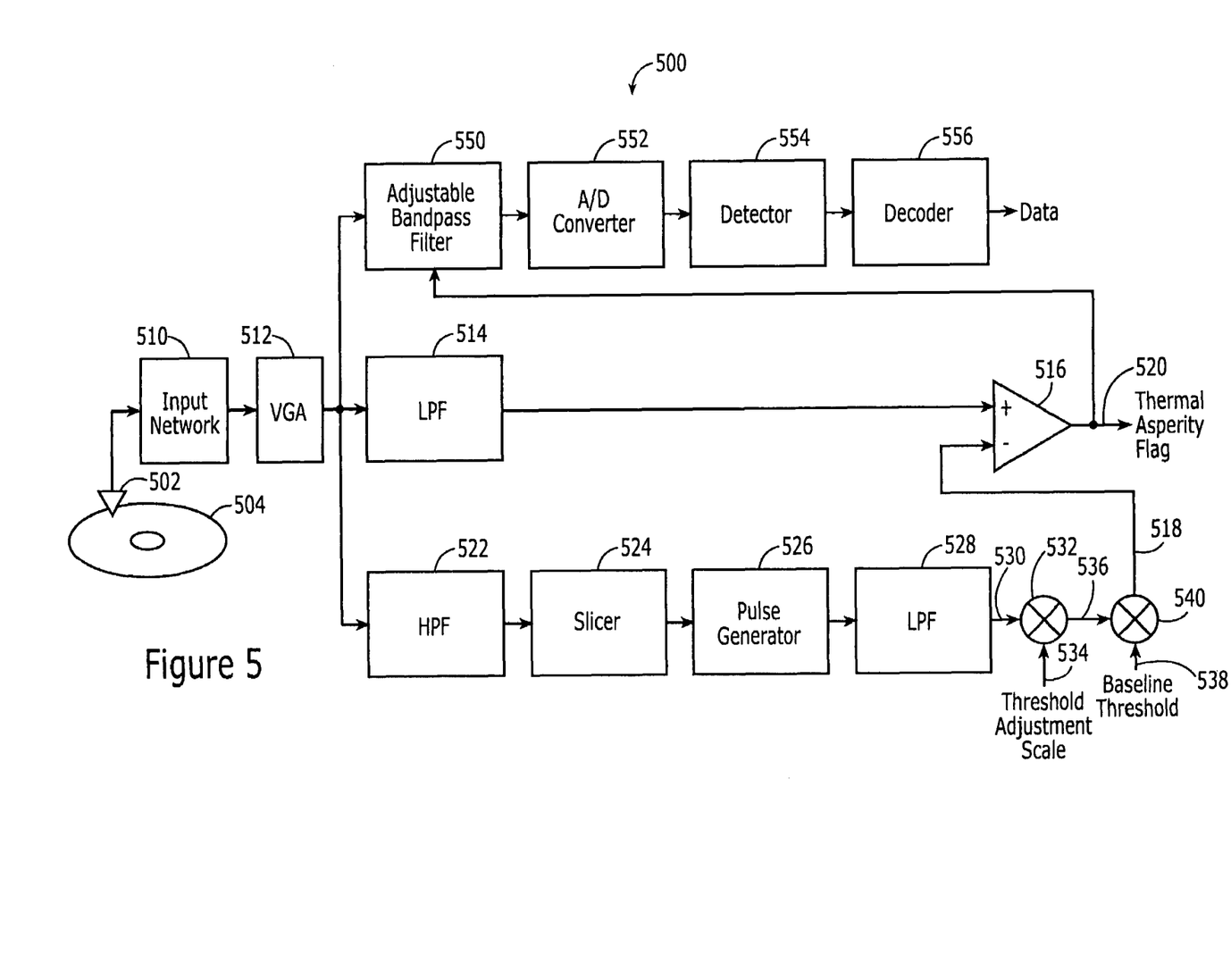
FIG. 5 is a block diagram of electronic circuits and methods in a disk drive that are configured to variably filter a read signal from a head in response to detection of a thermal asperity condition of the head in accordance with some embodiments of the present invention.

FIG. 5 is a block diagram of electronic circuits and methods in a disk drive that are configured to variably filter a read signal from a head in response to detection of a thermal asperity condition of the head in accordance with some embodiments of the present invention. Referring to FIG. 5, a head 502 generates a read signal while reading data from a magnetic data storage disk 504. The read signal includes a data component caused by data value transitions on the disk 504 and a thermal component caused by thermal related operational variables related to, for example, disk asperities as explained above. The read signal is conducted through an input network 510, which may be configured as an AC coupling circuit. A VGA 512 amplifies the read signal from the input network 510 with a variable amplification gain. A LPF 514 filters the amplified read signal to substantially attenuate the non-DC component. A comparator 516 compares the filtered read signal to a thermal asperity threshold signal 518. When the filtered read signal exceeds the thermal asperity threshold signal 518 the output signal 520 from the comparator 516 is increased to serve as a thermal asperity flag indicating the occurrence of an excessive level of the thermal component of the read signal and corresponding thermal asperity condition of the head 502. As will be explained below, the thermal asperity threshold signal 518 is varied in response to the rate of data value transitions in the data component of the amplified read signal from the VGA 512.

A high-pass filter (HPF) 522 filters the amplified read signal to substantially attenuate the DC component, and thereby attenuate the thermal component while leaving the data component of the read signal. A slicer 524 coverts the analog high-pass filtered read signal from HPF 522 to pulses, which may be binary pulses. Accordingly, the slicer 524 is configured to detect occurrence of data transitions in the data component of the read signal. A pulse generator 526 generates a constant-width constant-amplitude pulse in response to the leading edge of each pulse from the slicer 524. A LPF 528 integrates the constant-width constant-amplitude pulses from the pulse generator 526 to generate a threshold adjustment signal 530. The LPF 528 can include a resistor and capacitor network having values that are selected to provide a defined decay rate for use in integrating the constant-width constant-amplitude pulses. A multiplication circuit 532 multiplies the threshold adjustment signal 530 by a threshold adjustment scale signal 534 to adjust the amplitude of the threshold adjustment signal 530, resulting in signal 536. The threshold adjustment scale signal 534 can be a negative value so that the amplitude adjusted signal 536 is negative. A summing circuit 540 sums the amplitude adjusted signal 536 and a baseline threshold 538 to generate the thermal asperity threshold signal 518. When the amplitude adjusted signal 536 is negative and the baseline threshold 538 is positive, the baseline threshold 538 is reduced by the amplitude adjusted signal 536. The baseline threshold 538 is selected to provide a desired baseline margin between the read signal and the thermal asperity threshold.

Accordingly, a thermal asperity condition of a head is detected by comparing a filtered read signal to a thermal asperity threshold signal. As explained above and shown in the exemplary graphs of FIG. 4, the thermal asperity threshold signal is varied in response to the rate of occurrence of data value transitions in the data component of the read signal. More particularly, the thermal asperity threshold signal is lowered in response to a higher rate of data value transitions (e.g., 2 T rate pattern in timeframe 430a in FIG. 4), and is increased in response a lower rate of data value transitions (e.g., T rate pattern in timeframe 430b in FIG. 4). The detection sensitivity of the thermal asperity detector thereby dynamically adjusts in response to the data value transition rate, which may allow detection of lower level thermal asperity conditions with increased accuracy.

Figure 6:
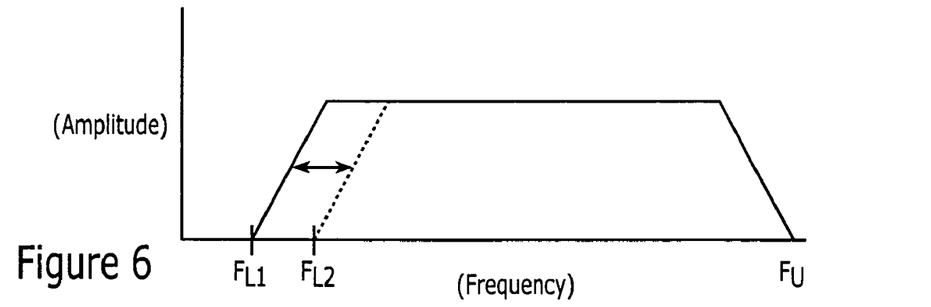
FIG. 6 shows a graph of exemplary attenuation characteristics of a adjustable band pass filter having a lower attenuation frequency which, in accordance with some embodiments of the present invention, is adjusted in response to detection of a thermal asperity condition, and which is used to filter a read signal.

As explained above, the output signal 520 from the comparator 516 can serve as a thermal asperity flag indicating the occurrence of an excessive level of the thermal component of the read signal and corresponding thermal asperity condition of the head 502. The read signal from the VGA 512 can be variably filtered in response to the output signal 520 so as to compensate for the effects of a detected thermal asperity condition. An adjustable band pass filter 550 is configured to have an adjustable lower attenuation frequency that is varied in response to the output signal 520 from the comparator 516, and an upper attenuation frequency which may be constant. Referring to FIGS. 5 and 6, an exemplary graph of the attenuation characteristics of the adjustable band pass filter 550 applied to the read signal from VGA 512 are shown. When the thermal asperity flag indicates no occurrence of a thermal asperity condition of the head 502, the filter 550 filters the read signal with lower attenuation frequency $F_{L1}$ and an upper attenuation frequency $F_U$. The lower attenuation frequency $F_{L1}$ can be selected to substantially attenuate the effect of baseline wander in the read signal. It is noted that the attenuated amplitude may be non-zero in contrast to the illustrated simulations. In contrast, in response to the thermal asperity flag indicating the occurrence of a thermal asperity condition of the head 502, the lower attenuation frequency of filter 550 is increased to $F_{L2}$ to substantially attenuate an excessive thermal component of the read signal caused by, for example, temperature variation of the head 502 due to disk asperities.

The band pass filtered signal from filter 550 is converted to a digital signal by an analog-to-digital (A/D) converter 552. A detector 554 detects bits in the digital signal, and a decoder 556 decodes data from the detected bits and outputs the data to, for example, a data controller and then to a host. The detector 554 may be, for example, configured to generate soft decision values based on digital signals using Viterbi based detectors. The decoder 556 may be, for example, configured to decode the data using a soft Reed-Solomon decoder and/or an iterative decoder which may include low density parity check (LDPC) codes or convolutional codes. It is to be understood that the functionality that has been described with regard to the functional blocks of FIG. 5 has been provided for purposes of explanation of an exemplary embodiment of the present invention, and that the present invention is not limited thereto. For example, the functionality that has been described with regard to blocks 552 and 554 may alternatively be configured in a similar manner to that described below with regard to blocks 622, 624, 626, and 628 of FIG. 9. Moreover, it is to be understood that functionality of the bandpass filter 550 may be spread among two or more functional blocks. For example, a low pass corner frequency filter (upper attenuation frequency) can be provided by a continuous time filter (e.g., see CTF 622 of FIG. 9) and the high pass corner frequency filter (lower attenuation frequency), which is controlled in response to the thermal asperity flag 520, can be within the input network 510.

The functionality of the thermal asperity detector may be integrated within one or more read channel application specific integrated circuits (ASICs) 500 and/or it may be distributed among other circuit elements, such as at least within a data controller or other processors, ASICs, analog components and/or a combination thereof.

Figure 7A:
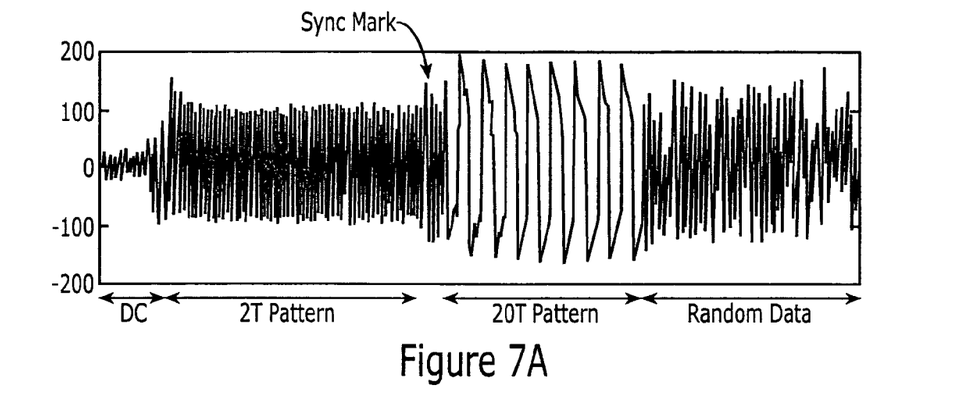
FIGS. 7A-B show graphs of results of a simulation which illustrate an exemplary read signal which is not subjected to a thermal asperity condition, a filtered read signal, and a thermal asperity threshold signal that is varied in response to the rate of data value transitions in the filtered read signal in accordance with some embodiments of the present invention.
Figure 7B:
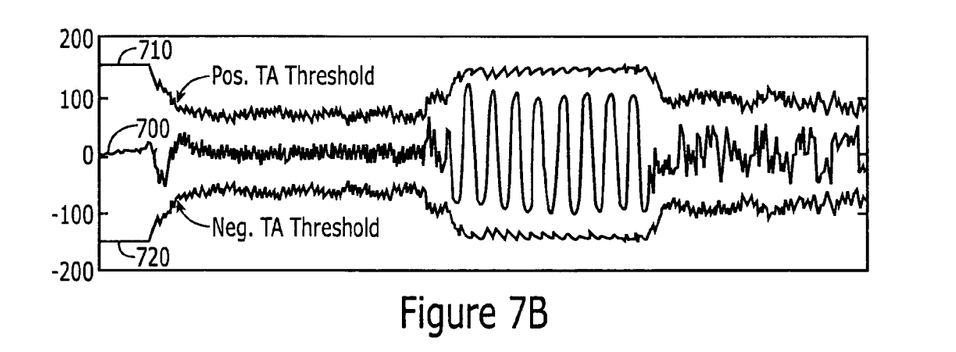

A further example of variation of the thermal asperity threshold signal is now discussed with reference to FIGS. 7A-B which represent the results of a simulation carried out for a read signal in a perpendicularly recorded hard drive during absence of a thermal asperity condition of the head. FIG. 7A is a graph of a read signal with four characteristic rates of data value transitions. In a first timeframe, the data component of the read signal has no data value transitions (identified as "DC"). In a subsequent second timeframe, the data component of the read signal has a 2 T rate of data value transitions (identified as "2 T Pattern"). In a subsequent third timeframe, the data component of the read signal has a 20 T rate of data value transitions (identified as "20 T Pattern"). In a subsequent fourth timeframe, the data component of the read signal has a random variable rate of data value transitions (identified as "Random Data"). Referring to FIG. 7B, waveform 700 represents the read signal shown in FIG. 7A after being low pass filtered (e.g., by LPF 514). Waveform 710 represents the thermal asperity threshold signal which, as shown in FIG. 7B, decreases in response to the data values transitions in the read signal changing from DC to the 2 T Pattern. The thermal asperity threshold signal was set higher during the DC region to compensate for higher expected baseline wander as a result of the DC region, and is then decreased during the 2 T pattern because a significant drop in baseline wander is expected. The waveform 710 then increases in response to the data values transitions changing from the 2 T Pattern to the lower frequency 20 T Pattern to compensate for an increase in baseline wander. The waveform 710 then decreases again in response to the data values transitions changing from the 20 T Pattern to Random Data. It is noted that the magnitude of waveform 710 dynamically changes in response to the rapid variations in rate of data value transitions of the Random Data. Moreover, as shown, the thermal asperity threshold signal can be varied within a range that may bounded between an upper threshold value and a base line threshold value.

Although various embodiments of the invention have been explained in the context of a positive thermal asperity threshold, it is to be understood that the thermal asperity threshold may be negative. For example, waveform 720 in FIG. 7B illustrates a negative thermal asperity threshold which changes in a similar, but opposite, direction to the waveform 710 (positive thermal asperity threshold) in response to changes in the rate of data values transitions in the read signal.

The simulations shown in FIGS. 7A-B were carried out with a threshold adjustment scale (534 of FIG. 5) of −0.8, a baseline threshold (538 of FIG. 5) of 130 mV (representing a constant offset of 90 mV and a detection margin of 40 mV).

Figure 8A:
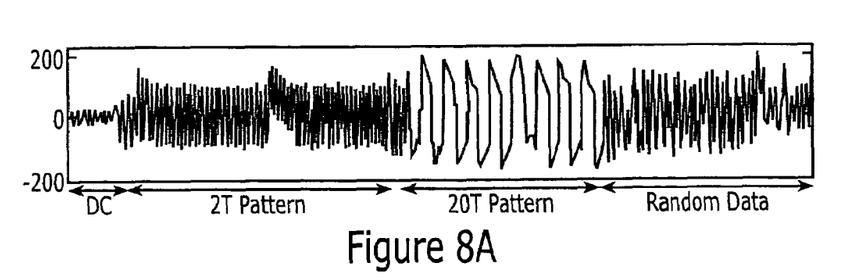
FIGS. 8A-C show graphs of results of another simulation which illustrate an exemplary read signal which is subjected to a thermal asperity condition, a filtered read signal, and a thermal asperity threshold signal that is varied in response to the rate of data value transitions in the filtered read signal in accordance with some embodiments of the present invention.
Figure 8B:
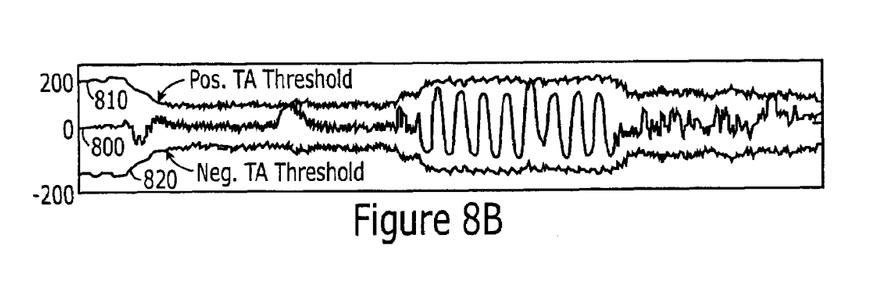
Figure 8C:
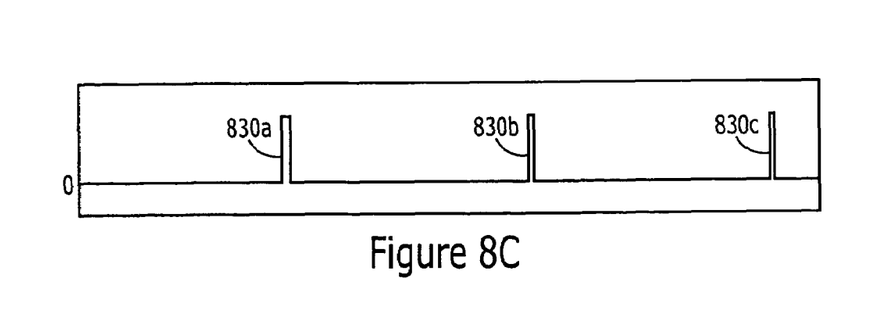

FIGS. 8A-C illustrate the results of another simulation which shows how variation of the thermal asperity threshold signal in response to the rate of data value transitions may allow detection of relatively smaller thermal asperity conditions with increased accuracy. The read signal represented by the waveform shown in FIG. 8A is substantially the same as the read signal shown in FIG. 7A, except that the read signal in FIG. 8A includes a thermal component that is caused by a thermal asperity condition of the head. Referring to FIG. 8B, The filtered read signal represented by waveform 800, the positive thermal asperity threshold represented by waveform 810, and the negative thermal asperity threshold represented by waveform 820 are substantially the same as waveforms 700, 710, and 720, respectively, shown in and explained with regard to FIG. 7B, except that the filtered waveform 800 includes a thermal component, having an amplitude of about 60 mV that is caused by a thermal asperity condition of the head. FIG. 8C illustrates the output signal from a comparator (e.g., comparator 516 in FIG. 5) that compares the filtered read signal 800 to the positive thermal asperity threshold 810. As shown in FIG. 8C, three thermal asperity conditions have been detected and indicated by the setting of thermal asperity flags 830a, 830b, and 830c. It is noted from the graphs of FIG. 8B, that the thermal asperity flags 830a and 830c would not have been generated if the thermal asperity threshold 810 had not been changed in response to changes in the data value transition rate (i.e., lowered in response to the 2 T pattern and the random data pattern relative to the 20 T pattern level). By varying the thermal asperity threshold in response to variation in the rate of the data value transitions, the thermal asperity detector demonstrated improved sensitivity in its ability to detect the relative small amplitude changes in the filtered read signal 800 caused by thermal asperity conditions.

Figure 9:
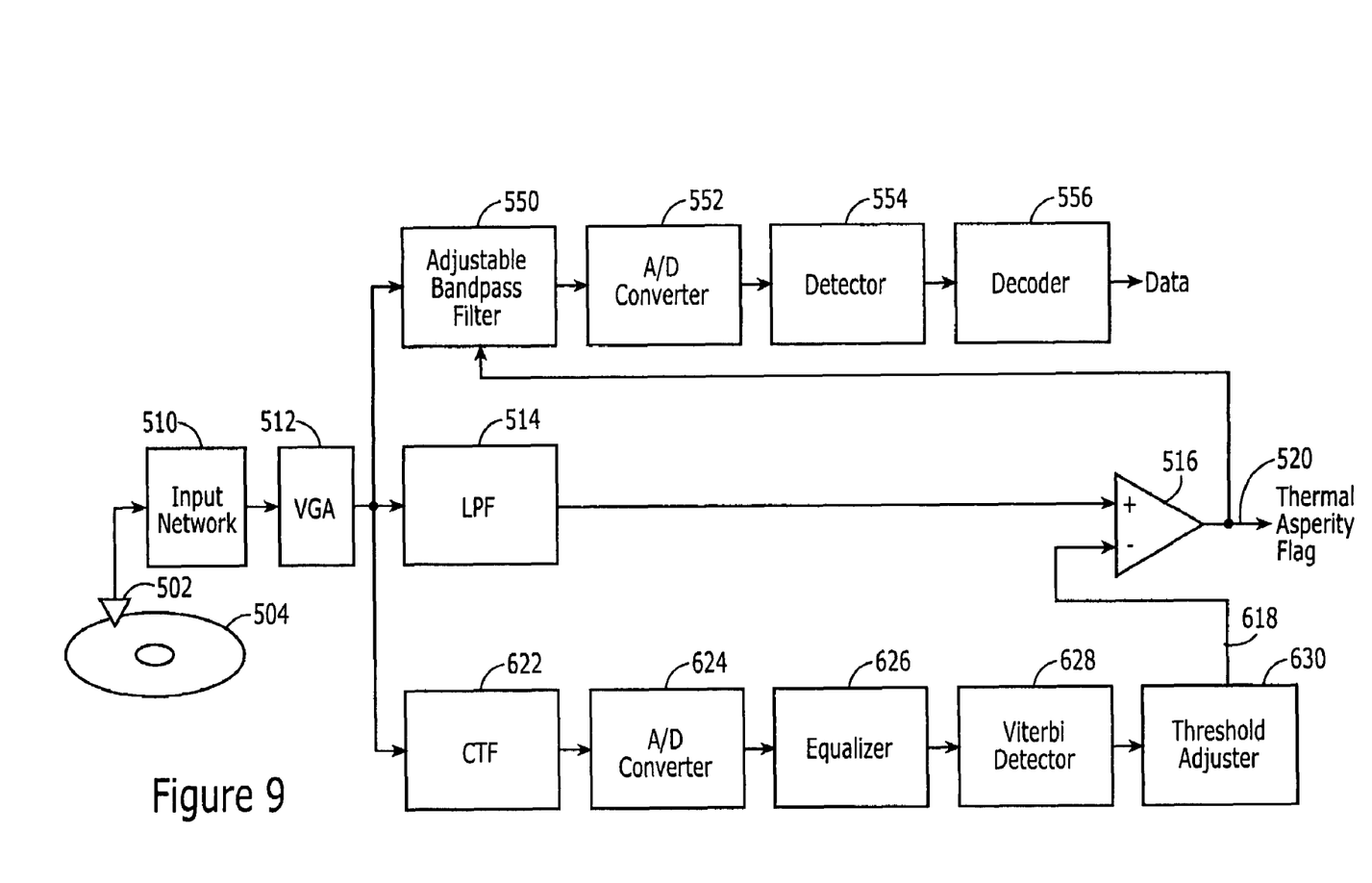
FIG. 9 is a block diagram of electronic circuits and methods in a disk drive that are configured to variably filter a read signal from a head in response to detection of a thermal asperity condition of the head in accordance with some embodiments of the present invention.

Detection of thermal asperities can be carried out with analog and/or digital circuitry. The functionality of the thermal asperity detector described with regard to FIG. 5 may be implemented in analog circuitry, which may allow faster tracking of rapid variations in the rate of data value transitions in the read signal. The functionality of the thermal asperity detector may also be implemented at least partially within digital circuitry, such as within a data controller processor. FIG. 9 is a block diagram of a disk drive that includes uses digital processing to equalize and detect data bits in the read signal, and then to adjust the thermal asperity threshold in response to rate changes in detected data bit transitions, and further illustrates corresponding methods thereof.

Referring to FIG. 9, the disk drive can include the disk 504, head 502, input network 510, VGA 512, LPF 514, comparator 516, adjustable band pass filter 550, A/D converter 552, detector 554, and decoder 556 which may be configured to operate in the same manner described with regard the corresponding components and methods shown in FIG. 5. Accordingly, the description of those components will not be repeated here for brevity. To detect occurrence of thermal asperity conditions, a continuous time filter (CTF) 622 filters the amplified read signal from the VGA 512. The filtered read signal is sampled by an A/D converter 624. The sampled read signal is equalized by an equalizer 626 to compensate, for example, for effects of inter-symbol interference and/or other read channel effects on the read signal. Bits in the read signal are detected by detector 628, which may include a Viterbi based operator. A threshold adjuster 630 responds to the rate of bit value variation between the detected bits to vary the magnitude of a thermal asperity threshold signal 618. As was explained with regard to FIG. 5, the functionality that has been described with regard to blocks 552 and 554 may alternatively be configured in a similar manner to that described for blocks 622, 624, 626, and 628. Moreover, it is to be understood that functionality of the bandpass filter 550 may be spread among two or more functional blocks. For example, a low pass corner frequency filter (upper attenuation frequency) can be provided by a CTF, similar to CTF 622, and the high pass corner frequency filter (lower attenuation frequency), which is controlled in response to the thermal asperity flag 520, can be within the input network 510.

The detection circuitry of FIG. 9 may provide more accurate responsive determination of the variation in the rate of data value transitions relative to the detection circuitry of FIG. 5, but it may do so at a higher level of manufacturing complexity and with greater delay between the occurrence of a thermal asperity condition and adjustment of the thermal asperity threshold and corresponding sensitivity of the detector.

Figure 10:
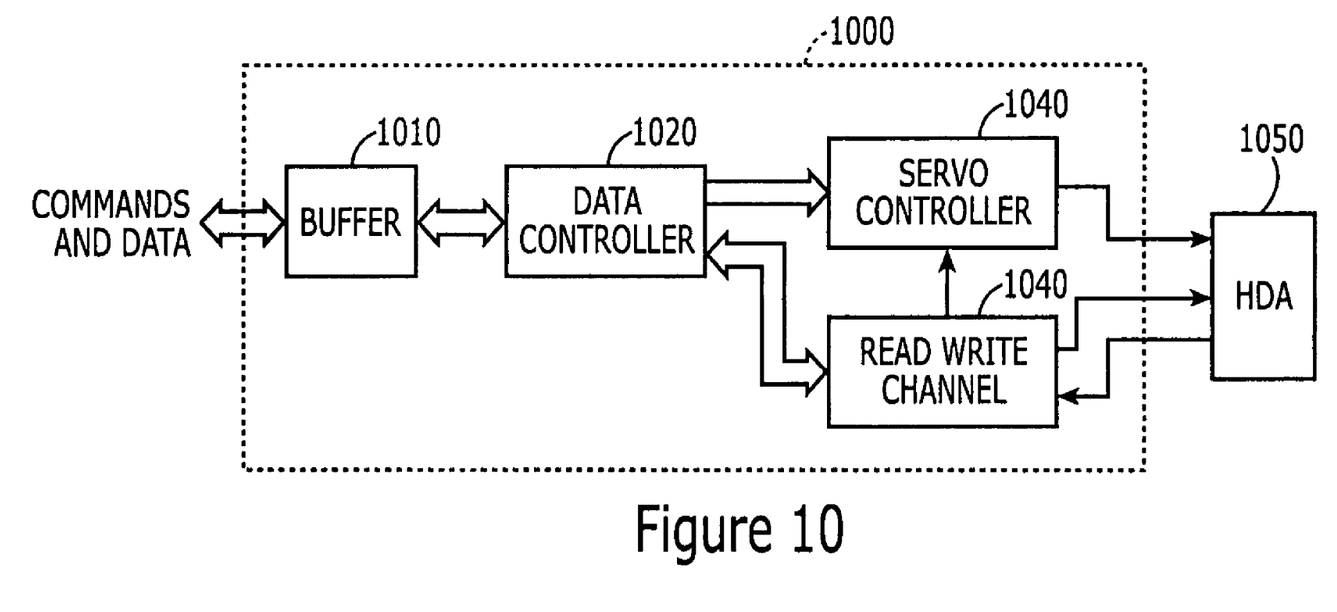
FIG. 10 is a block diagram of electronic circuits and methods of a disk drive in accordance with some embodiments of the present invention.

FIG. 10 is a block diagram of electronic circuits 1000 of a disk drive that can be configured to include at least some of the circuitry and/or to carry out at least some of the methods described herein in accordance with some embodiments of the present invention. The circuits 1000 can include a data controller 1020, a servo controller 1030, a read write channel 1040, and a buffer 1010. The exemplary circuits 1000 have been illustrated with separate controllers 1020 and 1030, buffer 1010, and read/write channel 1040 for purposes of illustration and discussion only. It is to be understood that the circuitry and methods described herein may be consolidated in fewer components or distributed among more components. A head disk assembly (HDA) 1050 can include one or more disks 504, an actuator arm assembly connected on one end to the head 502 and rotatably connected on another end to a base, a voice coil motor configured to rotate the actuator arm assembly to radially position the head 502 relative to tracks on the disk 504, and a spindle motor to rotate the disk 504.

Write commands and associated data from a host are buffered in the buffer 1010. The data controller 1020 is configured to carry out buffered write commands by formatting the associated data into blocks with the appropriate header information, and to transfer the formatted data from the buffer 1010, via the read write channel 1040, to Logical Block Addresses (LBAs) on the disk 504 where user data are stored and which are identified by the associated write command. The data controller 1020 can also carry out read commands by reading addressed data from the disk 504 and communicating the data to the host.

The read/write channel 1040 can convert data between the digital form used by the data controller 1020 and the analog form conducted through the head 502 in the HDA 56, and can further be configured to detect occurrence of a thermal asperity condition of the head 502 to compensate for the detected condition by adaptively filtering the read signal. The read write channel 1040 provides servo positional information read from the HDA 1050 to the servo controller 1030. The servo positional information can be used to detect the location of the head 502 in relation to LBAs on the disk 504. The servo controller 1030 can use LBAs from the data controller 1020 and the servo positional information to seek the head 502 to an addressed track and block on the disk 504, and to maintain the head 502 aligned with the track while data is written/read on the disk 504

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method comprising:
    comparing a read signal from a head to a thermal asperity threshold to detect occurrence of an excessive level of a thermal component of the read signal as a thermal asperity condition of the head; and
    varying the thermal asperity threshold in response to rate of occurrence of data value transitions in a data component of the read signal by
    generating signal pulses in response to data transitions in the data component of the read signal;
    combining the signal pulses over time to generate a threshold adjustment signal, and
    combining the threshold adjustment signal with a baseline threshold to generate the thermal asperity threshold.

2. The method of claim 1, wherein varying the thermal asperity threshold in response to rate of occurrence of data value transitions in the data component of the read signal comprises:
    increasing the thermal asperity threshold in response to a decrease in the rate of occurrence of data value transitions; and
    decreasing the thermal asperity threshold in response to an increase in the rate of occurrence of data value transitions.

3. The method of claim 2, further comprising ceasing further decrease of the thermal asperity threshold when the thermal asperity threshold satisfies a baseline threshold.

4. The method of claim 2, further comprising ceasing further increase of the thermal asperity threshold when the thermal asperity threshold satisfies an upper threshold.

5. A method comprising:
    comparing a read signal from a head to a thermal asperity threshold to detect occurrence of an excessive level of a thermal component of the read signal as a thermal asperity condition of the head; and
    varying the thermal asperity threshold in response to rate of occurrence of data value transitions in a data component of the read signal by
    filtering the read signal with a high pass filter to generate a filtered read signal,
    detecting pulse transitions in response to the filtered read signal,
    generating constant-width constant-amplitude pulses in response to the detected pulse transitions,
    combining the constant-width constant-amplitude pulses over time to generate a threshold adjustment signal, and
    combining the threshold adjustment signal with a baseline threshold to generate the thermal asperity threshold.

6. The method of claim 5, wherein:
    combining the constant-width constant-amplitude pulses over time to generate a threshold adjustment signal comprises integrating the constant-width constant-amplitude pulses to generate the threshold adjustment signal; and
    combining the threshold adjustment signal with a baseline threshold to generate the thermal asperity threshold comprises subtracting the threshold adjustment signal from the baseline threshold to generate the thermal asperity threshold.

7. The method of claim 6, further comprising adjusting amplitude of the threshold adjustment signal before subtracting the thermal adjustment signal from the baseline threshold to generate the thermal asperity threshold.

8. A method comprising:
    comparing a read signal from a head to a thermal asperity threshold to detect occurrence of an excessive level of a thermal component of the read signal as a thermal asperity condition of the head;
    varying the thermal asperity threshold in response to rate of occurrence of data value transitions in a data component of the read signal;
    setting a thermal asperity flag in response to the amplitude of the read signal exceeding the thermal asperity threshold; and
    filtering the read signal with a band pass filter having a lower attenuation frequency that is increased above a baseline lower attenuation frequency while the thermal asperity flag is set and that is reduced to at least the baseline lower attenuation frequency while the thermal asperity flag is not set.

9. A method comprising:
    comparing a read signal from a head to a thermal asperity threshold to detect occurrence of an excessive level of a thermal component of the read signal as a thermal asperity condition of the head; and
    varying the thermal asperity threshold in response to rate of occurrence of data value transitions in a data component of the read signal by
    detecting data bits in the data component of the read signal, and
    varying the thermal asperity threshold in response to a number of transitions between different data bit values over a defined time.

10. The method of claim 9, wherein varying the thermal asperity threshold in response to a number of transitions between different data bit values over a defined time comprises:
    increasing the thermal asperity threshold in response to a decrease in the number of transitions between different data bit values over the defined time; and
    decreasing the thermal asperity threshold in response to an increase in the number of transitions between different data bit values over the defined time.

11. The method of claim 9, wherein detecting data bits in the data component of the read signal comprises using a Viterbi based detector to detect the data bits in the data component of the read signal.

12. A circuit comprising:
    a thermal asperity detector that compares the read signal to a thermal asperity threshold to detect an excessive level of a thermal component of the read signal as a thermal asperity condition of the head, and varies the thermal asperity threshold in response to rate of occurrence of data value transitions in a data component of the read signal by generating signal pulses in response to data value transitions in the data component of the read signal, combining the signal pulses over time to generate a threshold adjustment signal, and combining the threshold adjustment signal with a baseline threshold to generate the thermal asperity threshold.

13. The circuit of claim 12, wherein the thermal asperity detector is further configured to increase the thermal asperity threshold in response to a decrease in the rate of occurrence of data value transitions in the data component of the read signal, and to decrease the thermal asperity threshold in response to an increase in the rate of occurrence of data value transitions in the data component of the read signal.

14. The circuit of claim 12, further comprising a filter that is configured to filter the read signal, wherein the filter has an adjustable attenuation frequency that is varied in response to the comparison of the read signal to the thermal asperity threshold.

15. The circuit of claim 14, wherein the filter is configured to attenuate baseline wander in the read signal.

16. The circuit of claim 14, wherein the filter comprises a band pass filter with an adjustable lower attenuation frequency that is varied in response to the comparison of the read signal to the thermal asperity threshold, and an upper attenuation frequency.

17. The circuit of claim 16, wherein the thermal asperity detector is further configured to increase a lower attenuation frequency of the band pass filter above a baseline lower attenuation frequency while a thermal asperity condition of the head is detected, and to reduce the lower attenuation frequency of the band pass filter to at least the baseline lower attenuation frequency while a thermal asperity condition of the head is not detected.

18. A circuit comprising:
a thermal asperity detector that compares the read signal to a thermal asperity threshold to detect an excessive level of a thermal component of the read signal as a thermal asperity condition of the head, and varies the thermal asperity threshold by
high pass filtering the read signal to generate a filtered read signal,
detecting occurrence of pulse transitions in the filtered read signal,
generating constant-width constant-amplitude pulses in response to the detected pulse transitions,
combining the constant-width constant-amplitude pulses over time to generate a threshold adjustment signal, and
combining the threshold adjustment signal with a baseline threshold to generate the thermal asperity threshold.

19. The circuit of claim 18, wherein the thermal asperity detector integrates the constant-width constant-amplitude pulses over time to generate the threshold adjustment signal, and subtracts the threshold adjustment signal from a baseline threshold to generate the thermal asperity threshold.

20. A circuit comprising:
a thermal asperity detector that compares the read signal to a thermal asperity threshold to detect an excessive level of a thermal component of the read signal as a thermal asperity condition of the head, and varies the thermal asperity threshold in response to rate of occurrence of data bit value transitions in a data component of the read signal by
detecting data bits in the data component of the read signal, and
varying the thermal asperity threshold in response to a number of transitions between different data bit values over a defined time.

21. The circuit of claim 20, wherein the thermal asperity detector is configured to increase the thermal asperity threshold in response to a decrease in the number of transitions between different data bit values over the defined time, and to decrease the thermal asperity threshold in response to an increase in the number of transitions between different data bit values over the defined time.

22. The circuit of claim 20, wherein the thermal asperity detector comprises a Viterbi based detector configured to detect the data bits in the data component of the read signal.

* * * * *